No. 769,226. PATENTED SEPT. 6, 1904.
L. T. MOFFETT & F. W. DUENCKEL.
ANGLE METER.
APPLICATION FILED FEB. 27, 1904.
NO MODEL.
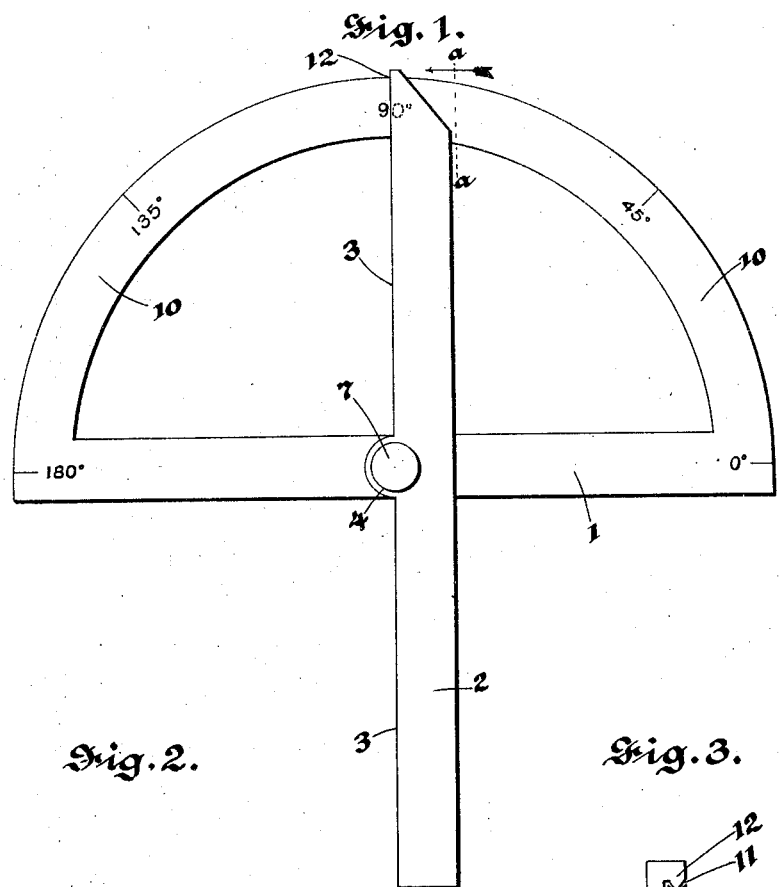

No. 769,226.

Patented September 6, 1904.

UNITED STATES PATENT OFFICE.

LLOYD TEVIS MOFFETT AND FREDERICK WILLIAM DUENCKEL, OF ST. LOUIS, MISSOURI.

ANGLE-METER.

SPECIFICATION forming part of Letters Patent No. 769,226, dated September 6, 1904.

Application filed February 27, 1904. Serial No. 195,678. (No model.)

*To all whom it may concern:*

Be it known that we, LLOYD TEVIS MOFFETT and FREDERICK WILLIAM DUENCKEL, citizens of the United States, and residents of St. Louis, Missouri, have invented new and useful Improvements in Angle-Meters, of which the following is a specification.

This invention relates to angle-meters; and it consists of the novel construction, combination, and arrangement of parts hereinafter shown, described, and claimed.

One object of this invention is to provide an angle-meter whereby angles can be accurately determined and ruled upon paper and the like without removing the device therefrom and comprising, essentially, two straight-edged members pivotally joined together, one carrying a pointer and the other a graduated scale upon which the pointer indicates the angles.

Another object is to provide a device of the class mentioned having means for retaining the pointer in juxtaposition to the scale, so that too great oscillation or movement of the pointer away from the scale will be positively prohibited.

Figure 1 is a plan view of the preferred form of our improved angle-meter. Fig. 2 is an enlarged detail sectional view of the pivot device holding the two straight-edged members together. Fig. 3 is an enlarged sectional view on the line *a a* of Fig. 1 looking toward the left, as indicated by the arrow.

In the construction of this device a suitable straight-edged member 1 has pivotally mounted thereon a member 2, which can be turned to any angle relative to the member 1. These two parts may be of metal or any other preferred material, and one may be shorter or longer than the other, as preferred. The ruling edge 3 of the member 2 has a lateral projection 4, through which is an opening 5, in such position that the line extended from the edge 3 will pass diametrically across said opening, the purpose of which is to make the ruling edge 3 turn radially from the center of the pivot, thereby insuring accurate measurement of the angle. A threaded pivot-pin 6 is attached to and projects upward from the member 1 through the opening 5, only that portion of the pin above the member 2 being threaded. A nut 7, having a knurled head 8 for a thumb and finger hold and an interiorly-threaded bore 9 for the reception of the upper threaded portion of the pin 6, screws down to hold the parts 1 and 2 in the different adjustments. The bore 9 is of greater depth than the length of the pin 6 or the projecting portion thereof, so that in event of the surface of the part 2 becoming worn the nut can still be screwed down to bind thereon. The advantage of this is obvious.

The member 1 carries a semicircular graduated scale 10, and the member 2 projects over the same, the surface 3 thereof being straight, except for the projection 4 throughout its length. A groove 11 is formed around the the outer edge of the part 10, and the pointer end of the member 2 carries a projection 12, which extends around and into said groove, thereby preventing separation of the pointer from the scale when the nut 7 is loose. In this form of device the member 2 lies upon the members 1 and 10 and the member 1 joins the ends of said member 10, thereby forming a very substantial connection of all the parts.

In this form of angle-meter a complete angle can be drawn while the device is in position on the paper, the straight edges affording guides for drawing the lines, and similarly the same angle can be produced on different sheets or places by tightening the ruling members in the required adjustment and transferring the entire device to the new position.

We claim—

1. An angle-meter comprising a semicircular scale having a groove in its outer edge, a support and brace rigidly connecting the ends of the scale and extending diametrically across the circle of which the scale is a part, a straight-edged member on said support and brace, said member having a lateral projection midway of its ends to receive a pivot in line with its edge so that one edge throughout its length is on the radius of the circle of which the scale is a part to provide a straight ruling-line from the edge of the scale to the opposite end of the member except the portion occupied by the support and brace, a hook integral with the straight-edged member projecting into the groove in the scale, and a clamp device for holding the straight-edged member.

2. An angle-meter comprising a semicircular scale having a groove in its outer edge extending from end to end, a support connecting the ends of the scale, a threaded pivot-pin rigid with the center of the support, a ruling member upon the support, said ruling member having a lateral projection provided with an opening to receive the pivot-pin in such position that the ruling edge of the said ruling member throughout the length thereof is constantly on the radius of the circle irrespective of the position to which the member may be turned, a hook on the end of the ruling member projecting into the groove in the scale, and a nut screwed upon the pivot-pin, said nut having a threaded bore of greater depth than the length of the pivot-pin above the ruling member, for the purpose specified.

In testimony whereof we hereto affix our signatures in the presence of two witnesses.

LLOYD TEVIS MOFFETT. [L. S.]
FREDERICK WILLIAM DUENCKEL. [L. S.]

Witnesses:
GEO. W. PETER,
J. D. RIPPEY.